(12) United States Patent
Zich et al.

(10) Patent No.: US 6,783,119 B2
(45) Date of Patent: Aug. 31, 2004

(54) PACKING FOR HEAT- AND MATERIAL-EXCHANGE COLUMNS

(75) Inventors: Egon Zich, Leichlingen (DE); Helmut Jansen, Dormagen (DE); Jochen Leben, Düsseldorf (DE); Thomas Rietfort, Bottrop (DE); Jörg Zellmer, Dortmund (DE); Björn Kaibel, Hilden (DE)

(73) Assignee: Julius Montz GmbH, Hilden (DE)

( * ) Notice: Subject to any disclaimer, the term of this patent is extended or adjusted under 35 U.S.C. 154(b) by 24 days.

(21) Appl. No.: 10/181,188

(22) PCT Filed: Jan. 17, 2001

(86) PCT No.: PCT/EP01/00488

§ 371 (c)(1),
(2), (4) Date: Jul. 30, 2002

(87) PCT Pub. No.: WO01/52980

PCT Pub. Date: Jul. 26, 2001

(65) Prior Publication Data

US 2003/0047821 A1 Mar. 13, 2003

(30) Foreign Application Priority Data

Jan. 18, 2000 (DE) .......................................... 100 01 694

(51) Int. Cl.[7] ................................................. B01F 3/04
(52) U.S. Cl. .............................. 261/112.2; 261/DIG. 72
(58) Field of Search ........................... 261/94, 95, 104, 261/112.2, 153, 154, DIG. 72

(56) References Cited

U.S. PATENT DOCUMENTS

| | | | | |
|---|---|---|---|---|
| 2,809,818 A | * | 10/1957 | Munters | 261/24 |
| 3,374,992 A | * | 3/1968 | Greer | 261/112.2 |
| 4,518,544 A | * | 5/1985 | Carter et al. | 261/112.2 |
| 5,124,086 A | * | 6/1992 | Schultz | 261/112.2 |
| 5,167,879 A | * | 12/1992 | Streng | 261/112.2 |
| 5,616,289 A | * | 4/1997 | Maeda | 261/112.2 |
| 6,206,349 B1 | * | 3/2001 | Parten | 261/112.2 |
| 6,251,499 B1 | * | 6/2001 | Lehman et al. | 428/182 |
| 6,427,985 B1 | * | 8/2002 | Kaibel et al. | 261/112.2 |

FOREIGN PATENT DOCUMENTS

| | | |
|---|---|---|
| DE | 12 87 096 | 1/1969 |
| DE | 12 93 796 | 4/1969 |
| DE | 29 21 270 C2 | 11/1980 |
| DE | 39 18 483 | 12/1990 |
| FR | 14 49 375 | 7/1966 |
| GB | 10 80 991 | 8/1967 |
| JP | 6-277401 | * 10/1994 |

* cited by examiner

*Primary Examiner*—Scott Bushey
(74) *Attorney, Agent, or Firm*—Herbert Dubno

(57) ABSTRACT

The invention relates to a packing for heat- and material-exchange columns, with a number of approximately perpendicularly arranged corrugated plates (or strips), with the side surfaces thereof lying adjacent to each other. The ribs of the above lie very close to each other and run from top to bottom, in the approximate form of an arc, whereby the ribs of two adjacent plates cross each other and the ribs in the upper region of a plate are straight and inclined to the upper, in particular, horizontal place are straight and inclined to the upper, in particular, horizontal plate edge and, in the lower region of the plate, run bent in the form of an arc.

10 Claims, 5 Drawing Sheets

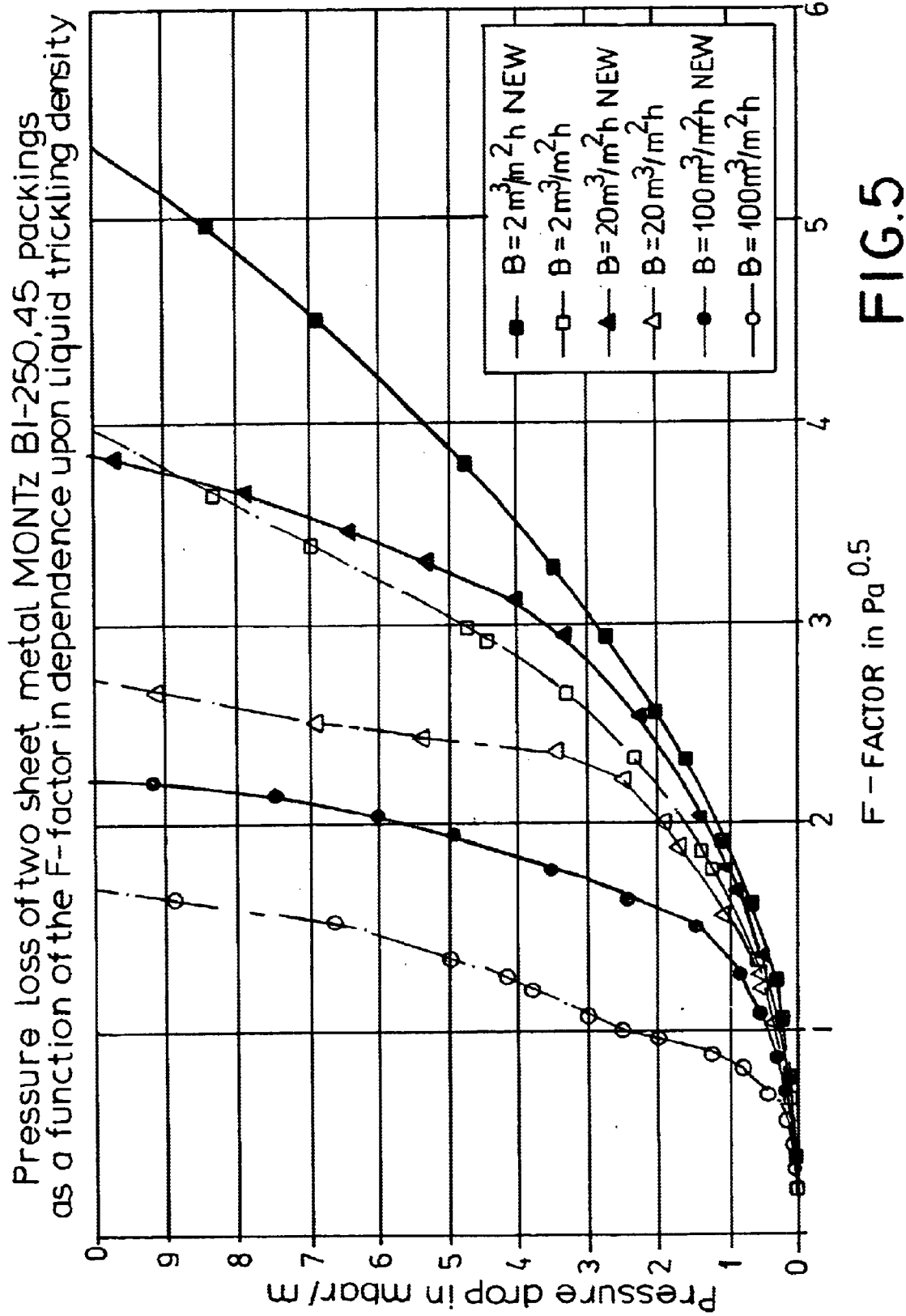

PACKING FOR HEAT- AND MATERIAL-EXCHANGE COLUMNS

CROSS REFERENCE TO RELATED APPLICATIONS

This application is the US national phase of PCT application PCT/EP01/00488 filed Jan. 17, 2001 with a claim to the priority of German patent application 10001694.4 itself filed Jan. 18, 2000 under the International Convention.

FIELD OF THE INVENTION

The invention relates to a packing for heat exchange and material exchange (mass transfer) columns with a multiplicity of generally vertically arranged corrugated plates (or strips) having their side surfaces adjacent one another and whose adjacent ribs run from top to bottom in a generally arcuate pattern whereby the ribs of two adjoining plates cross each other.

BACKGROUND OF THE INVENTION

In distillation, absorption, gas scrubbing and similar operations in process technology, columns are used which contain baffles for the heat exchange and mass transfer exchange between liquid and gas. These baffles are comprised either of trays, for example bubble trays, tunnel trays, sieve trays or valve trays, of randomly arranged packings like for example Raschig rings, Pall rings or saddles, or of ordered packings in various geometric configurations.

With ordered packings the geometries of cross channel structures have ranged widely in technological applications. As is generally the case with packed columns, maximum capacity with ordered packing is also limited in the cross-channel structure by the development of a flooded state. The visual observation of the flooded state in distillation columns which are equipped with packings of a cross channel structure which shows that the flooding always develops at the lower edge of the individual packing layers. In order to increase productivity of such packings, one seeks to modify the lower edge of the individual packing layers and partly in addition the upper edge of the individual packing layers so at to increase the attainable throughput of liquid and gas.

In EP 858 830 A1 it is proposed to increase the spacing of neighboring packing elements at the lower edge of the packing layers by there reducing the bend height. As a further possibility a partial or complete removal of a part of the material, for example at every second packing element from the lower end of the packing layer. The drawback of this approach is that it affects the separating efficiency and causes deterioration in the mechanical strength of the packing.

The alternative possibility is protected in WO 97/16247 in which the geometry of the cross-channel structure is altered. The bends are no longer straight as is customarily the case, but rather are of S shape configuration and are so arranged that the short column orientation at the lower and upper ends of the packing layers run approximately vertically. The fabrication of this packing is expensive. A drawback is that over the packing height there are small lateral offsets of the flow passages through the vertically-running lower and upper ends. This reduces the desired lateral transverse mixing of the gas flow. To compensate for this drawback, additional liquid collectors and distributors must be optionally provided to limit the problematical distributions.

DE 39 18 483 describes a packing with a variable height geometry in which the short columns of the cross-channel structure run substantially vertically and parallel to one another at the lower end and are increasingly bent toward the horizontal upwardly. In order to provide at the lower region of the packing layer, a sufficient mechanical stability in the bends between neighboring corrugations or folds, planar sections are provided. Here as well a damming up of liquid should be avoided.

A packing with a cross-channel structure is described in DE 29 21 270 C2 in which the folds have an arcuate path. The individual plates are alternatively so mounted that the greater flow resistance lies alternately upwardly and downwardly so that in this construction there is no shift of the flooding state to higher loadings. Further packings with nonlinear fold paths are described in DE 12 93 796, DE 12 87 096, FR 14 79 375 and GB 10 80 991.

OBJECT OF THE INVENTION

The object of the invention is to provide an ordered packing which can have an increased throughput by comparison with the known packing in cross-channel structures.

SUMMARY OF THE INVENTION

This object is achieved according to the invention in that the ribs in the upper region of a plate are straight and inclined to the upper, especially horizontal plate edge and in the lower region of the plate run with an arcuately curved pattern.

Such a packing produces an especially high throughput at an optimal efficiency. The structure is simple and enables inexpensive manufacture and simple mounting.

BRIEF DESCRIPTION OF THE DRAWING

Advantageous embodiments of the invention are shown in the drawings and will be described in the following in greater detail. They show FIGS. 4 and 5: research results with the packing according to the invention.

SPECIFIC DESCRIPTION

Figure 1:
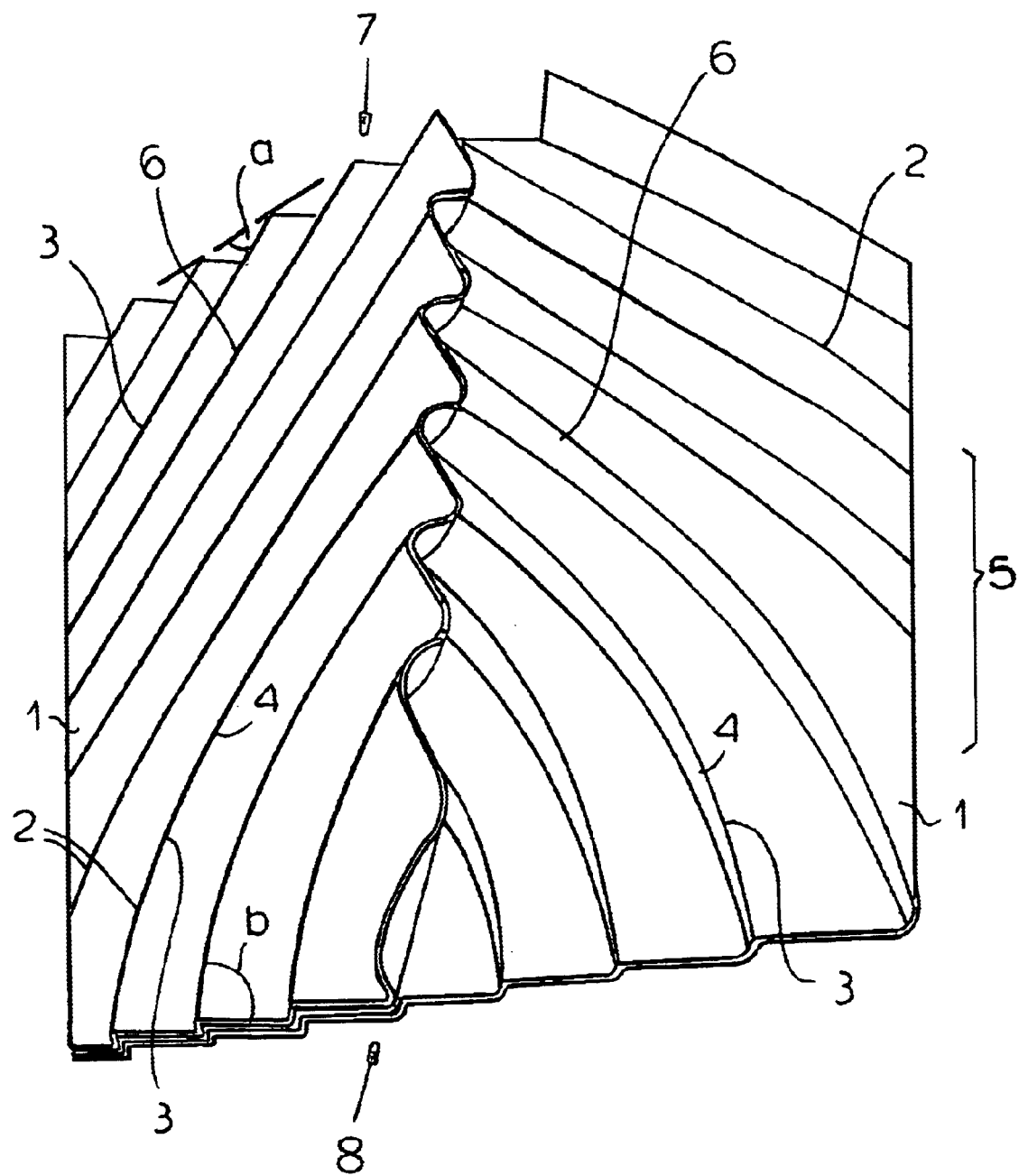
FIG. 1: a perspective illustration of two adjacent plates/strips in section whereby the upper one is removed in the region to the right, FIGS. 2a and b: bend angles at the lower ends of a plate/strip.
Figure 2A:
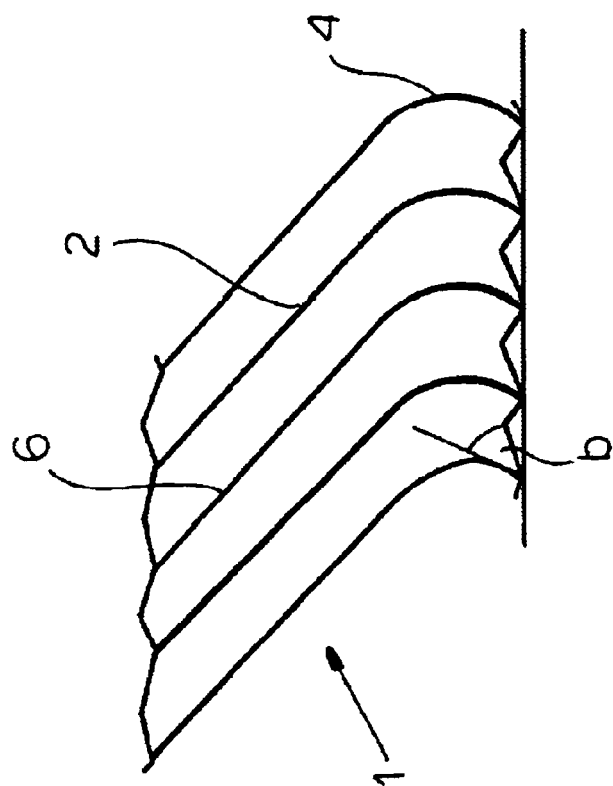
Figure 2B:
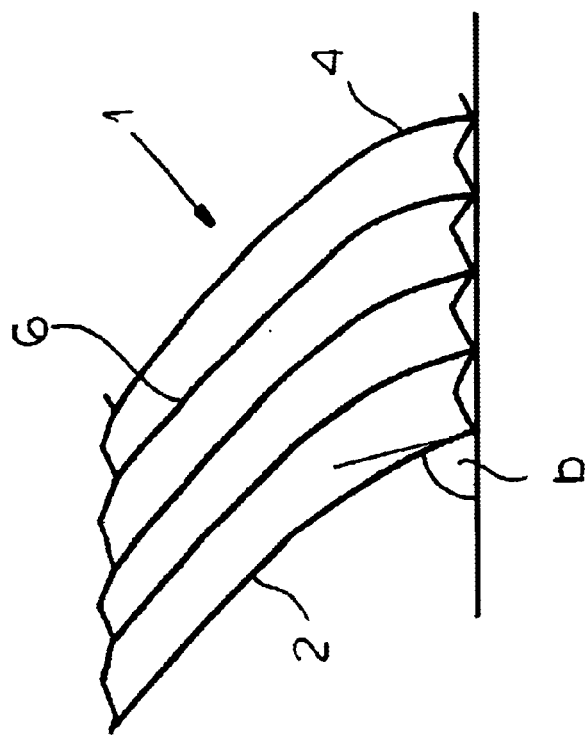

The packing is comprised of a multiplicity of strips or plates 1 which lie against one another with their side surfaces, which are provided with ribs lying transversely to the longitudinal direction, whereby the strips 1 are so arranged that the ribs of neighboring strips in contact with one another cross each other and run in arcs 3 which are parallel to one another. The arcs at their lower portions preferably have an arc-segmental pattern 4 and transition in the middle region 5 into linear rib segments 6 which are inclined to vertical. The ribs 2 have at the upper edge 7 of the packing an angle a of 30 to 70°, preferably 45 to 60°, to the horizontal and at the lower edge 8 an angle b of 75 to 88°, preferably from 80 to 85°, whereby these inclinations of the ribs are in the same or in opposite directions of those at the upper ends of the packing.

Figure 3:
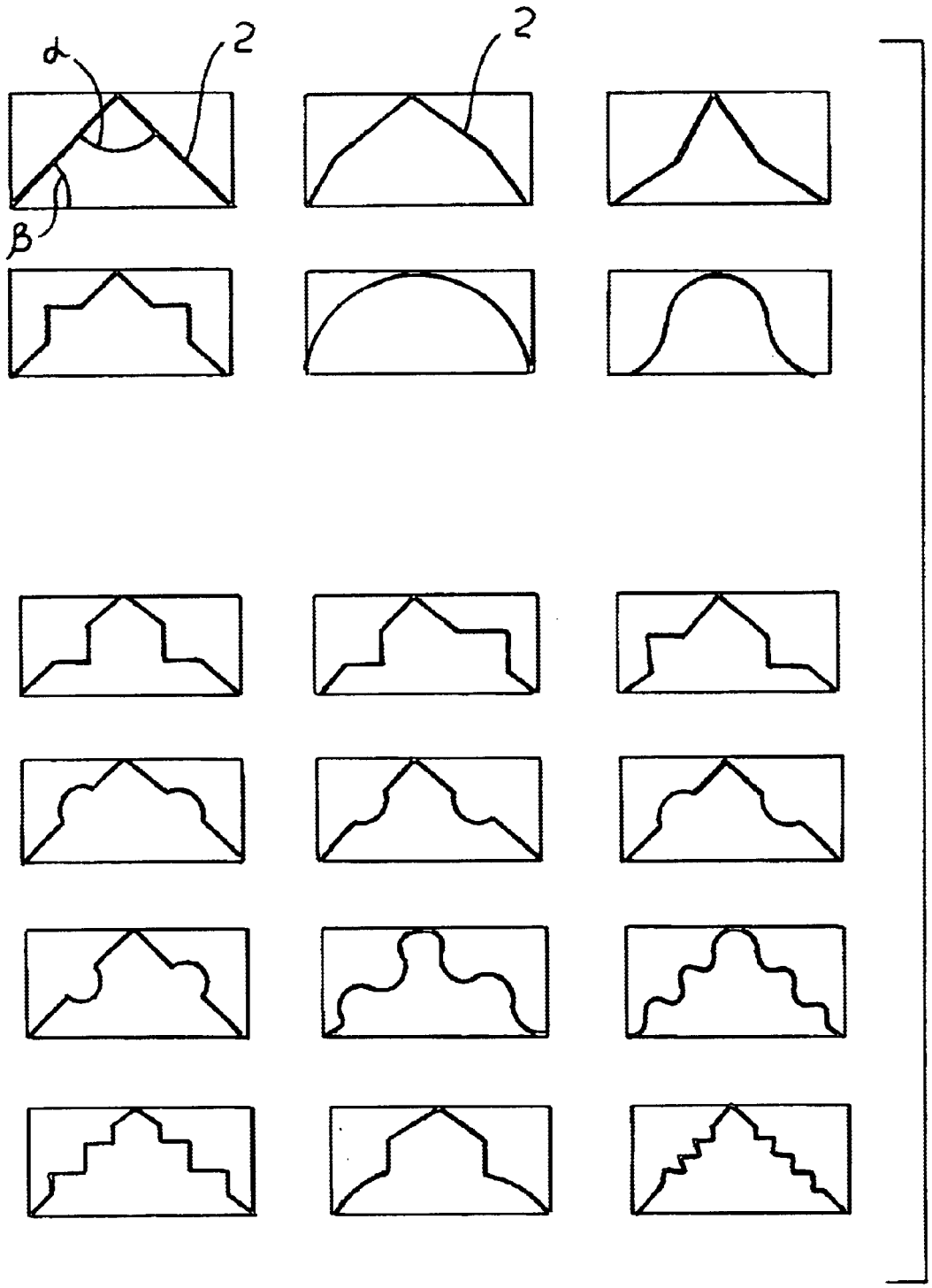
FIG. 3: different cross sections of ribs each illustrated within a frame.

Alternatively to the continuous arcuate pattern of the ribs it is possible to approximate the pattern by a multiplicity of linear segments or similar geometries, see FIG. 3.

Preferably, the fold angle a which the ribs 2 of the strips form, are so configured upon fabrication that they over the height of the packing in the horizontal direction always yield cross sectional areas with approximately square cross sections. Thus for a given utilization of material, a packing structure with the greatest possible hydraulic diameter is formed.

The desired square openings is achieved in the simplest manner by variation of the band angle outlet. This varies in the case of commercially-available packing of a cross channel structure between about 70° and 90°. Between the fold angle Δ the inclination angle β of the bends with respect to the horizontal and the angle γ which the bends form with respect to one another in the horizontal direction, the following relationship applies $$\tan \alpha/2 = \tan \gamma/2 \cdot \sin \beta.$$

For the preferred case of square openings with γ=90°, one obtains $$\tan \alpha/2 = \sin \beta.$$

One thus chooses the bend angle α for example with an inclination angle β of 45 to 79.5° and with an inclination angle β of 60 to 81.8°.

In a preferred and, not sharp-edged configuration of the fold 1, the bend radius of the fold is preferably less than 15% of the rib width. A sharp edged configuration should be avoided since it will favor droplet entrainment.

To avoid droplet entrainment, the angle β which the ribs 2 form at the upper edge of the packing with respect to the horizontal should not lie below a value of 30° to 45°, preferably 45° to 60°.

The circular arc pattern of the ribs 2 should be transmitted as well as possible. With two sharp deflections, a stronger droplet entrainment can be observed. This is especially the case for packings which on the lower and upper ends of the packing layers have bends with especially narrow radii. According to the invention the bend radius of the ribs should not be below 25%, preferably 30%, to the height of the packing layer. In combination with bends which are configured without sharp edges, experimental tests have shown an especially effective suppression of the droplet entrainment.

To the planar ribs which are configured as in the state of the art, other rib forms which are variable in height or height-independent can be used to further reduce the droplet entrainment whereby, height-dependent profiles starting from a planar form, introduce a surface enlargement which can make the heat exchange and mass transfer more effective. According to the invention, with height-dependent profiles, the lower end has a planar form using the greatest possible hydraulic diameter. FIG. 3 shows possible configurations from which the preferred are nonsharp edged bent forms, especially effective are round forms for reducing the droplet entrainment.

Neighboring packing layers are rotated with respect to one another respectively by 30 to 150°, preferably 90°. Upon introduction of the packing layers, the layers preferably are additionally dynamically loaded, for example by hammering or are statically loaded, for example by the application of weights so that the number of contact locations is increased. The strength of these effects will depend upon the packing material used.

Figure 4:
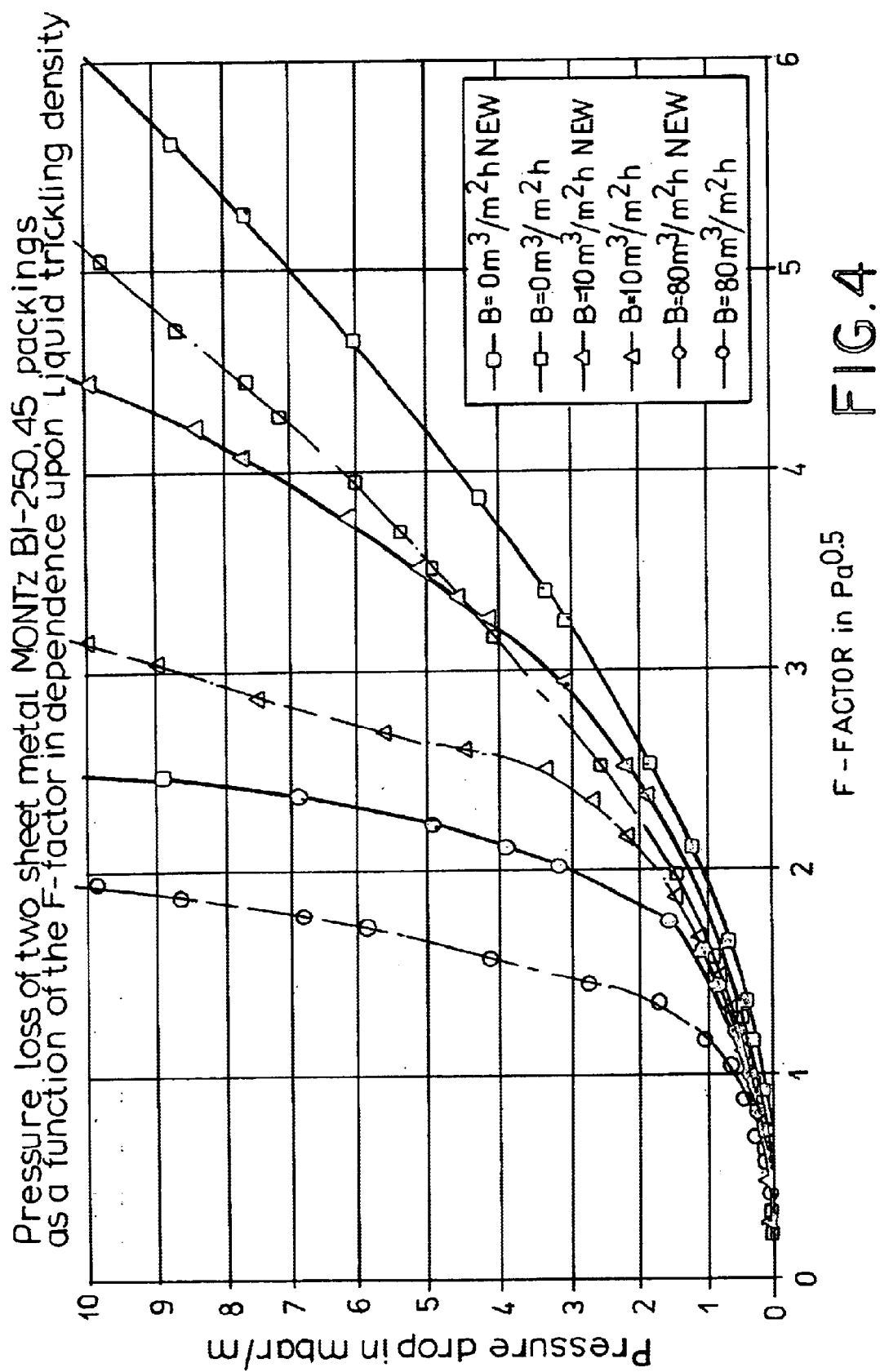

The packing of the invention permits throughput which exceed those conventional packing by some 30 to 50%. FIG. 4 shows the results of tests with the air/water system.

What is claimed is:

1. A packing for a heat-exchange or mass-transfer column, comprising:

a multiplicity of corrugated sheets disposed generally vertically with lateral surfaces juxtaposed with one another and ribs of adjacent sheets formed by the corrugations crossing each other and contacting one another, said sheets having upper horizontal edges, and the corrugations having patterns such that:

the ribs at an upper region of each of said sheets are straight, mutually parallel and oblique to the respective upper edge, and at a lower region of each sheet the ribs are curved in respective arcs running to a lower edge of each sheet;

longitudinal axes of upper ends of said ribs of each sheet each include an angle of 30° to 70° with the respective upper edge; and longitudinal axes of lower ends of said ribs of each sheet each include an angle of 75° to 90° with the respective lower edge.

2. The packing defined in claim 1 wherein the angle included by said longitudinal axes of said upper ends of said ribs with the respective upper edge is 45° to 60°.

3. The packing defined in claim 1 wherein the angle included by the longitudinal edges of lower ends of said ribs of each sheet with the respective lower edge is 80° to 85°.

4. The packing defined in claim 1 wherein, at a point where a rib of one sheet and a rib of an adjacent sheet cross each other and the proximal square-shaped cross sectional area is formed between them.

5. The packing defined in claim 1 wherein each rib has a ridge forming an arch whose radius is less than 15% of the width of the respective rib.

6. The packing defined in claim 1 wherein the arc of each rib is formed by a multiplicity of adjoining segments.

7. The packing defined in claim 6 wherein said segments are straight segments.

8. The packing defined in claim 1 wherein a multiplicity of packing layers are disposed one above another and in contact with one another and each layer is rotated with respect to another layer in contact therewith by 30° to 150°.

9. The packing defined in claim 8 wherein the packing layers are rotated with respect to one another by 90°.

10. The packing defined in claim 8 wherein the packing layers are loaded upon assembly with one another.

* * * * *